3,384,503
PROCESS FOR THE FORMATION OF THIN OPAQUE COATINGS
Halsey Bidwell Stevenson, McDaniel Heights, Wilmington, Del., assignor to E. I. du Pont de Nemours and Company, Wilmington, Del., a corporation of Delaware
Continuation-in-part of application Ser. No. 176,134, Feb. 27, 1962. This application July 10, 1964, Ser. No. 381,652
11 Claims. (Cl. 117—36.7)

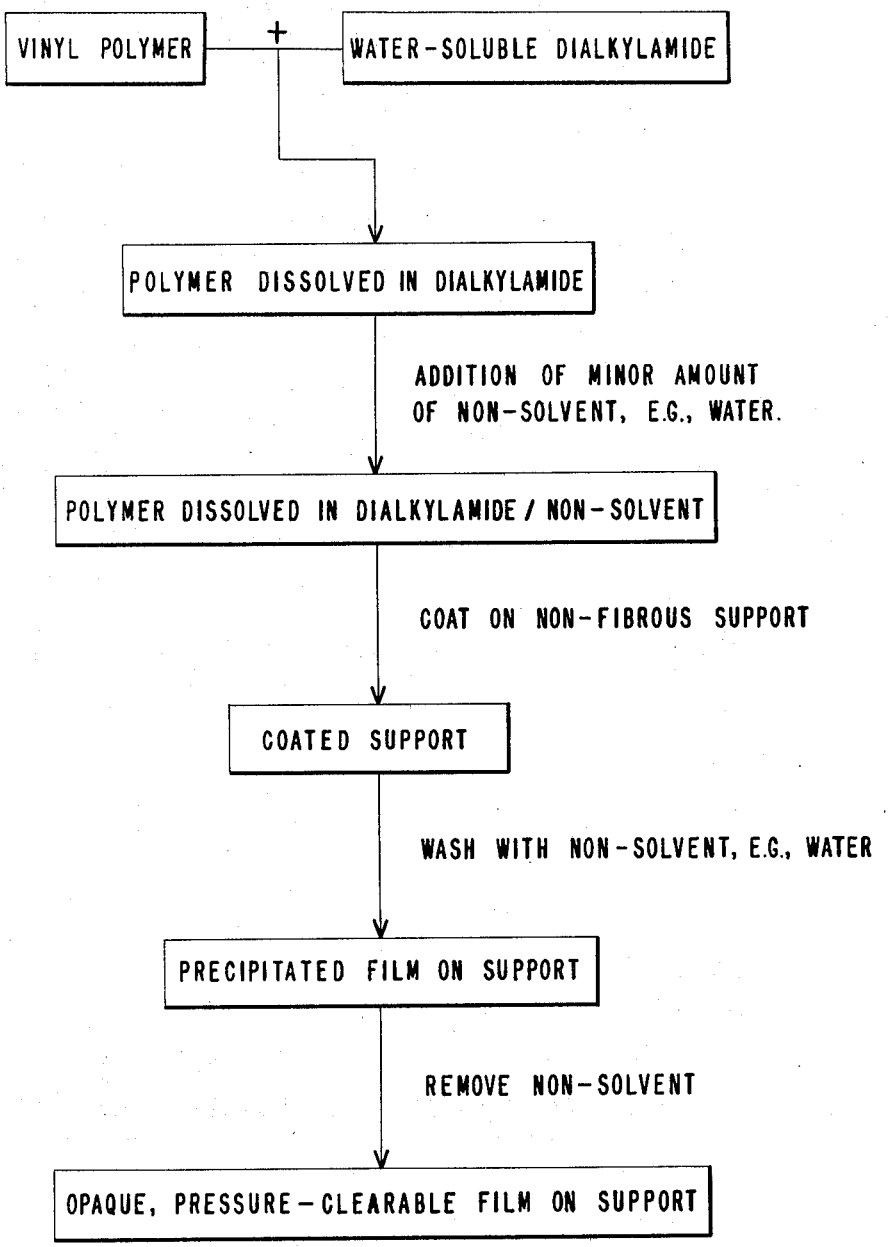

ABSTRACT OF THE DISCLOSURE

Process for forming thin, opaque pressure-clearable vinyl polymer films (a) by coating a support with a solution of a vinyl addition polymer in a water-soluble dialkylamide, the solution containing water or alkanols of 1–4 carbon atoms or mixtures in an amount of 45%–97% of that required to produce a hazy solution, (2) treating the coating with water or an alkanol to extract said dialkylamide before evaporation of said dialkylamide, and (3) removing said water or alkanol from the coating.

---

This application is a continuation-in-part of my prior application Ser. No. 176,134 filed Feb. 27, 1962, now abandoned.

This invention relates to a new and improved process for the preparation of thin, opaque films of pressure-clearable, porous polymers.

Opaque films of hydrophobic vinyl-type polymers which have open-cell voids which are clearable to substantial transparency upon application of pressure have been described in U.S. Patent 2,957,791. Films of this general type have many uses, one of technical importance being described in U.S. application S.N. 63,953 filed Oct. 21, 1960, now U.S. Patent No. 3,149,967, and which involves use in providing clear images in the film for use in exposing photosensitive printing plates. For this utility, as well as other potential applications in the storing and reproduction of information, thin films of high dimensional stability are of great importance. A means of obtaining such a product has been to deposit a thin, opaque layer of pressure-clearable polymeric material upon a dimensionally stable base of good strength and clarity. A base that combines strength, flexibility, dimensional stability (particularly at elevated temperatures), transparency, and inertness to a high degree, is of the oriented polyester type, e.g., polyethylene terephthalate. However, an inherent property of this base, namely, the inertness, results in difficulty of adhering to it an opaque, pressure-clearable layer of a vinyl type polymer. Good adhesion is essential to avoid separation of the coating from the base when a pressure-developing means, e.g., type face, is removed after contact with the opaque layer in forming a clear image of said type face.

According to this invention, a superior pressure-clearable, opaque polymer layer having a thickness of up to 5 mils on a non-fibrous hydrophobic transparent base or film support can be obtained by (a) coating the support with a solution of a water-insoluble linear polymer in a water-soluble dialkylamide solvent, which solution contains a hydroxyl-containing non-solvent for said polymer boiling at or below 100° C. in an amount of at least 45% but not more than 97% and preferably between 80 and 95% of that required to form a hazy solution, and (b) treating the coating element, before there has been any significant evaporation of the solvent, with a coagulating non-solvent for said polymer, e.g., water, to extract the solvent (dialkylamide) by action of the non-solvent with which it is miscible and thereby produce the opaque pressure-clearable layer and the coating at the time of treating containing 45% to 97% of the amount of non-solvent necessary to form a hazy solution, and (c) separating the non-solvent from the coating. Alternatively, in step (a) the solution may contain less than 45% of the non-solvent required to form a hazy solution at coating and the necessary non-solvent may be added by absorption from the gaseous atmosphere prior to coagulation. The layer is then dried to remove the non-solvent.

The process is illustrated in the graphic flow sheet of the attached drawing.

The novel process for the formation of opaque, pressure-clearable vinyl polymer films having a thickness of 0.1 mil to 5.0 mils when dry comprises:

(a) Coating a non-fibrous support with a solution of (1) 10% to 25% by weight of a water-insoluble vinyl addition polymer having a molecular weight of at least 10,000 and a softening point in the range 50° C.–100° C. in (2) a water-soluble dialkylamide wherein each alkyl group containing 1–2 carbon atoms; said solution containing a hydroxyl-containing non-solvent for said polymer selected from the group consisting of water, alkanols of 1–4 carbon atoms and mixtures of said non-solvents boiling at a temperature no higher than 100° C., in an amount of at least 45% but not more than 97% of that required to produce a hazy solution;

(b) Treating the resulting coating before there has been any significant evaporation of the water-soluble dialkylamide therefrom with a non-solvent selected from the group consisting of water and alkanols of from 1 to 4 carbon atoms, to extract said dialkylamide, and (c) Removing said hydroxyl-containing non-solvent from the coating.

In carrying out the invention, step (b) is carried out at a temperature above the dewpoint of the surrounding atmosphere while the coating contains 45% to 97% of non-solvent.

The precise selection of solvent, non-solvent and polymer and the exact amount of non-solvent are of importance. If the non-solvent content of the coating solution exceeds the above amount and is sufficient to initiate precipitation of any polymer or form a dispersion (which can be readily observed by the development of opalescence, turbidity, or large viscosity change in the polymer solvent mixture), the coating that is obtained by casting such a polymer/solvent/non-solvent solution onto the support followed by immersion in non-solvent results in the formation of a non-uniform film having very poor adhesion to the substrate. On the other hand, when an amount of non-solvent is less than 45% that necessary to cause haziness due to precipitation of the polymer in the solution, the resulting film is less porous and has low opacity although it is smooth and uniform.

For the production of the thin, opaque, pressure-clearable coating on a support for the uses desired, the support itself should have a high degree of clarity, i.e., be transparent and exhibit little, if any, opacity. It should be also be dimensionally stable and flexible. The film should be substantially unaffected by temperatures in the range of from below 0° to above 100° C. The support should be inert to solvents and to low-boiling hydroxyl-containing material such as water. It should also be substantially unchanged by pressures of the order of 500 to 10,000 lb./sq. in. on a film having a thickness of about a mil. For the process of this invention, the films of greatest interest are thin, i.e., have a thickness of 0.5 to 7 mils and preferably within the range of about 1 to 4 mils. Any film having these properties could be employed in the process of this invention. However, those from condensation polymers are most useful. A specific film that is readily available and meets the requirements as indicated above is of the polyester type and specifically polyethylene terephthalate.

The linear polymer (preferably non-elastomeric vinyl type) used to give the opaque coating is hydrophobic, i.e., water-insensitive. It is formed by addition polymerization or copolymerization. The polymer should be relatively high softening, since polymers having a low softening point, e.g., at temperatures of just above room temperatures, are difficult to maintain in storage as opaque films. Furthermore, low pressures as developed by mild abrasion on storage or handling may clear or scratch such an opaque film. Polymers that possess an extremely high softening point are not particularly desired since the pressures necessary for selective clearing of such would be higher than normally used for storing information on opaque films. The vinyl polymer is essentially linear and substantial amounts of crosslinking are not desired. In general, the polymer should have a heat distortion or softening temperature of at least 50° C. and generally in the range of 50–100° C. as determined by ASTM test number D–648–56. In general, the vinyl-type polymer is formed by addition polymerization or copolymerization of negatively substituted ethylenically unsaturated monomers to form a polymer having a molecular weight of about 10,000 or higher. Examples of useful polymers are those of vinyl halides, particularly vinyl chloride, acrylic monomers such as methacrylonitrile, acrylic esters and more than one of such monomers with minor amounts of vinyl esters and other vinyl-type monomers as are well-known to the art.

The properties of relatively high softening temperature, strength, homogeneity, solubility in a water-soluble dialkylamide-type solvent and insolubility in a hydroxyl non-solvent such as water are provided by vinyl chloride copolymers in which vinyl chloride is the major constituent, and such are preferred. Further requirements of the polymer relate to the degree of solubility in solvents and ability of the solution to tolerate a small but substantial amount of hydroxylic non-solvent without precipitation of the polymer.

The vinyl polymer is dissolved by water-soluble solvents which have a boiling point of at least 100° C. The solvent should dissolve large amounts of the polymer at ordinary temperature usually to form a stable solution having 10 to 25% of polymer, which solution is of sufficiently low viscosity to cast into a film. Solvents useful in practicing the invention include dialkylamides wherein each alkyl group contains 1–2 carbons and includes dimethylformamide, diethylformamide, dimethylacetamide, diethylacetamide, methylethylacetamide, N-methyl-2-pyrrolidone, and tetramethylurea. These solvents are miscible with polymer non-solvents such as water, methyl alcohol, or ethyl alcohol or mixtures of such non-solvents. Furthermore, the useful solvents form hydrates with water as evidenced by a relatively high heat of dilution. By such a choice of solvents, the solution of the polymer tolerates small amounts of hydroxylic non-solvent without precipitation of the polymer, but when immersed in water (or other such non-solvent), the polymer coagulates or precipitates substantially immediately. In contrast to the use of the dialkylamides, when other solvents such as tetrahydrofuran, dioxane, or the monomethyl ether of diethylene glycol are used, immersion of the solution in water requires longer times for coagulation of the polymer and the resultant opacity, pore size, and good dye absorption properties of the polymer as an opaque film are not achieved.

The non-solvent used in the process of this invention to provide the solvent/non-solvent/polymer solution used for formation of the opaque film has a boiling point below that of the solvent. Furthermore, it is completely miscible with the liquid solvent but will not by itself dissolve the polymer. The non-solvents are hydroxyl-containing and include the alkanols of 1 to 4 carbon atoms and water. Water is particularly preferred since it is readily available and provides good opacity in the coated product prepared by the process of this invention. The amount of non-solvent added to the polymer solution prior to coagulating the film is critical. The maximum amount of non-solvent the solution will tolerate is readily observed by adding with stirring small amounts of non-solvent to the solution. The point of haze formation is just prior to precipitation of the polymer. When haze formation takes place on addition of non-solvent, the amount of non-solvent added is defined as 100% of the amount required to precipitate polymer from the solution. The latter is readily observed by change in appearance and Newtonian flow characteristics in the mixture. The haze end point is readily determined by adding with stirring the non-solvent, e.g., water, to an aliquot of the polymer solution. At the end point, haziness is observed. When more non-solvent such as water is used, the viscous polymer solution changes its characteristics from those of a Newtonian liquid. Fluid flow, as judged by viscosity, undergoes an abrupt change at the latter point. Colloidal particles separate and impart opalescence, haziness, or turbidity as the haze point is reached. For some polymer solutions, a large optical density change takes place. The use of a polymer solution containing non-solvent to the point of opalescence, formation of turbidity, etc., gives coatings of inferior adhesion to the substrate. The amount of non-solvent added to the polymer solution or layer must be over 45% of that required to form a hazy solution of polymer as coated films obtained by using polymer solution containing such a small amount of non-solvent, i.e., substantially less than 45%, do not exhibit the high opacity desired for uses particularly in photoprinting. The best results in the preparation of highly opaque films having fine pores are obtained when the non-solvent and, in particular, water content of the polymer solution is between 80 and 95% of the amount required to cause haze formation in the polymer solution.

These solutions are generally prepared by dissolving the polymer in substantially anhydrous dialkylamides such as dimethylformamide to form a relatively concentrated solution containing up to 25% of the polymer. Although the polymer can be dissolved in the dialkylamide containing small amounts of water or non-solvent, solution in the latter is not as rapid. The concentrated solution is then diluted with a mixture of solvent and non-solvent to the final concentration for casting films, usually containing 10–18% of the polymer. The viscosity of the resulting solution can be subject to wide variation. The only requirement is that the viscosity be acceptable to flow, or be coated readily, onto a substrate and form a uniform film. Solutions of viscosity of about 100 cps. to as high as 30,000 cps. have been employed to give acceptable opaque, pressure-clearable coatings on a transparent substrate. In general, however, the viscosity should be 500 to 2500 cps. for ease of application.

The coating thickness of opaque, pressure-clearable films depends on the amount of polymer in the solution and the coating layer as cast onto a suitable support. In general, the solution coating is applied to the substrate at a thickness of the order of 0.5 to 10 mils prior to removal of solvent by immersion in a non-solvent, and drying. In the preferred products, the ultimate dry film thickness of opaque coating is not over 5 mils and preferably within the range of 0.1 to 1.5 mils with 0.2 to 0.8 mil the most desired. The opaque film has a bulk density of usually less than 0.5 g./ml. and generally not over 0.4 g./ml.

The coating can be applied to the base and the solvent extracted with non-solvent at about room temperature. The time required for coagulation is generally short. For example, at a coating or casting speed of about 100 ft. per min., a dimethylformamide solution of a polyvinyl chloride copolymer gives a hard, opaque film after only 1–2 inches of travel in water, e.g., a contact time of about 1/20 of a second. The coagulating bath is mainly all non-solvent, although the amount of solvent can increase to minor proportions, e.g., to 30%. High opacity and cohesion of the coating have been observed for films prepared in baths having substantial, but minor, amounts of solvent. The temperature of coating should remain above the dewpoint of the surrounding atmosphere to minimize significant absorption of moisture.

The following examples further illustrate the process of the invention. The polyester film was uncoated, biaxially oriented, polyethylene terephthalate film.

Example I

A copolymer of 75 to 80% vinyl chloride and 20 to 25% of methyl acrylate was isolated from a latex by adding toluene followed either by freezing to coagulate and washing to purify the polymer or by heating to 75° C., adding saturated salt solution to obtain particulate polymer followed by further heating, washing, and drying. A solution was prepared by dissolving 40 parts of the above purified copolymer in 190 parts of dimethylformamide. A series of solutions was prepared by replacing a small portion of the dimethylformamide with small amounts of water. Films were cast from the solutions of polymers by using a doctor knife set for 3-mil clearance onto a 2-mil polyester film which had been squeegeed to a smooth glass plate. The coated polyester film was immersed in water immediately after coating to avoid change in water content prior to film coagulation. After immersion in the water for about 2 minutes, the coated film was removed from the water and dried. The following table shows the percent water present in the casting solution, thickness of the dried opaque pressure-clearable film and its optical density as measured with a Welch "Densicron" upon the film itself and upon a dyed film which has been immersed in a 9% aqueous solution of a black half-chromed azo acid dye. In the attached table, the first item shows low optical density that results from the absence of water in the casting solution. The third and fourth showed dramatic improvement in these properties when the water content is relatively high. When the casting solution contained water to the point of incipient precipitation, the resulting film obtained was rough and had very poor adhesion to the polyester substrate.

| Percent of Water to Form Precipitate | Percent Water (of solution) | Film Thickness, mils | Optical Density | |
|---|---|---|---|---|
| | | | Original | Dyed |
| 0 | [1] 0 | 1.4–1 5 | 0.30–0.32 | 2.2–2.4 |
| 49 | 2.2 | 1 2–1.4 | 0.36–0.38 | 2.7–3.0 |
| 85 | 3.8 | 1.2–1.4 | 0.61–0.66 | 4.8–4.9 |
| 96 | 4.3 | 1.1–1.2 | 0.60–0.63 | 4.7 |

[1] Control.

Example II

The general procedure of Example I was repeated except that the film cast was at a thickness approximately ½ that of the preceding example. The casting solution contained 13.3% polymer in dimethylformamide and the indicated amount of water as shown in the following table. The solution was cast in an atmosphere containing 30% relative humidity on a 2-mil polyester film and immersed in water.

| Percent of Water to Form Precipitate | Percent Water (of solution) | Film Thickness, mils | Optical Density | |
|---|---|---|---|---|
| | | | Original | Dyed |
| 0 | [1] 0 | 0.6–0.8 | 0.18–0.20 | 1.6–1.9 |
| 44 | 2 | 0.6–0.7 | 0.20–0.21 | 2.0–2.1 |
| 67 | 3 | 0.6–0 7 | 0.22–0 23 | 2.1–2.2 |
| 82 | 3.7 | 0.6–0.7 | 0.40–0.41 | 4.6–4.7 |
| 96 | 4.3 | 0.6–0.6 | 0.42–0.45 | 4.9 |
| 98 | 4 4 | 0.5–0.6 | 0.48–0.50 | 4.9 |

[1] Control.

Example III

A clear solution was prepared containing 9.4% of a 90/10 copolymer of vinyl chloride/vinyl acetate and 9.4% of a 86/13/1 copolymer of vinyl chloride/vinyl acetate/unsaturated dibasic acid, and 3.5% water with the remainder being dimethylformamide. The amount of water present was about 82% of that required to precipitate polymer, since when the water content was increased to 4.25%, cloudiness and precipitation occurred. The solution was cast onto a 2-mil polyester film using a doctor knife set for 2-mil clearance. The coated film was immediately quenched in a water bath and after several hours blotted and dried. The thickness of the coating was 0.5 to 0.6 mil. The coating had good adhesion to the base film. It had an optical density of about 0.35 which after dyeing as in Example I increased to 2.3–3.4. A portion of the opaque film cleared by impact had an optical density of 0.12.

Example IV

A clear solution of 25% of a vinyl chloride/vinyl acetate/dibasic acid copolymer, 3.8% water, and 71.2% dimethylformamide was cast as in the preceding example. The casting solution contained about 83.5% of the amount of water necessary to precipitate polymer, since addition of water to an aliquot to an amount of 4.55% lowered the viscosity from 940 to 440 cps. and the mixture became opaque with formation of precipitate. The coating thus obtained after washing and drying had good adhesion to the polyester film. It had an optical density of 0.53 and after application of pressure gave clear areas of optical density of about 0.2. The use of aqueous and alcoholic solutions of dye described in Example I increased optical density to 1.5–4.5 (with the greater value obtained when alcoholic solution of the dye was used).

Example V

A solution containing 13.3% of a copolymer of 75–80% vinyl chloride/20–25% methyl acrylate, 36% of methanol, and 50.7% of dimethylformamide was coated onto a 2-mil polyester film, immersed in water, washed, and dried. The solution employed contained about 95–99% of hydroxylated non-solvents necessary to precipitate the copolymer since gelation occurred after standing for a long period of time. Properties of the dried, opaque, pressure-clearable films at 20 and 40% relative humidity of the ambient atmosphere, before coagulation, are as follows:

| R.H., Percent | Film Thickness, Mils | Optical Density | |
|---|---|---|---|
| | | Original | Dyed |
| 20 | 0.7–0.8 | 0.28–0.29 | 2.82–3.78 |
| 40 | 0.4–0.5 | 0.24–0.25 | 3.56–3.86 |
| 40 | 0.7–0.8 | 0.30 | 4.00–4.35 |

Example VI

A solution of 30 g. of the copolymer of the preceding example in 114 g. of dimethylformamide was diluted with a mixture of 52 g. of dimethylformamide, 22.5 g. of methanol, and 6.7 g. of water to give a solution containing 13.3% of the copolymer, 10% methanol and 3% water. Pressure-clearable films were obtained by coating on a 2-mil polyester film at 20% relative humidity, immersing in water and drying. The properties of the opaque coatings are given in the following table:

| Film Thickness, mils | Optical Density | |
|---|---|---|
| | Original | Dyed |
| 0.5–0.6 | 0.30–0.31 | 3.66–3.68 |
| 0.6–0.7 | 0.29 | 3.13–3.54 |

A mixture containing 13.3% of the copolymer, 13.3% of methanol, and 4% of water in dimethylformamide gelled, i.e., the polymer precipitated from solution. Accordingly, the solution employed above contained approximately 75% of the quantity of hydroxyl-containing non-solvents required to precipitate the polymer.

Instead of coating the solution of the foregoing examples onto a polyethylene terephthalate film base, they may be coated onto any suitable other support, e.g., cellulose esters, cellulose mixed esters; superpolymers, e.g., polyvinyl chloride (co) vinyl acetate, polyvinyl acetals, e.g., formals, acetals, polystyrene, polyamides, e.g., polyhexamethylene adipamide, and polyesters, e.g., polycarbonates, polyethylene terephthalate/isophthalate, esters formed by condensing terephthalic acid and dimethyl terephthalate with propylene glycol, diethylene glycol, tetramethylene glycol or cyclohexane - 1,4-dimethanol (hexahydro-p-xylene alcohol), and films of U.S. 2,627,088.

A further method that can be employed although it is less precise is to permit the solution containing the hygroscopic solvent to pick up non-solvent such as water from vapor of such material in an atmosphere. For example, the polymer solution employed in Example I as the control containing no moisture was cast at a 3-mil thickness on polyester film of 2-mil thickness and held for about two minutes at approximately 50° C. in air containing 50–60% relative humidity. During this time, moisture was picked up by the film and a small amount of dimethylformamide lost by evaporation. The film at the end of this time contained 3½ to 4% of water, i.e., 80 to 90% of that necessary to precipitate the polymer. At the end of this time, the film was immersed in water at 25° C. and after 30 minutes, removed and air dried. The dried film had a coating thickness of 1.5 to 1.8 mils and an optical density of 0.52 to 0.54. After immersion in the black dye as described in Example I, the optical density was 4.8 to 4.9.

It is thus seen that the relative humidity of the atmosphere and time of contact can change the water content of a solution. The rate of water pickup by a thin layer of water-soluble solvent can be measured at various conditions of relative humidity. It is preferred that the relative humidity be such that during the time interval between coating and washing of the film, i.e., the time the polymer solution is in contact with gaseous atmosphere, the water content of the polymer solution will remain within the 45–97% of that required to precipitate polymer.

The atmospheric conditions are also selected such that for the contact time, loss of either solvent or non-solvent to the atmosphere will not be such as to permit the solution of polymer being used for coating to fall below the 45% content of non-solvent or increase the non-solvent to effect precipitation of the polymer from solution.

It is preferred that, when a solution of polymer in solvent containing 45–97% of the amount of water necessary to precipitate the polymer is employed for coating, the atmosphere has a low relative humidity. However, if the humidity is relatively high, the contact time with the atmosphere should be short in order that uniformity and high quality of the resulting opaque films are achieved.

Dialkylamides are known to be quite hygroscopic and readily pick up moisture from a humid atmosphere. Thus, a dimethylformamide solution containing about 4% of water is in equilibrium with an atmosphere at about 8% relative humidity. If coagulation is not carried out immediately after coating, the ambient atmosphere should be controlled to prevent an increase in water content of the coating to above 97%.

The exact amount of water in a coating solution can be readily determined, e.g., with the conventional Karl Fischer reagent or spectrophotometrically. However, the easiest method is by titration of an aliquot with water to obtain the point at which turbidity is observed (or a change in viscosity takes place). For many polymers, particularly those of high homogeneity, an optical density change in the solution defines the end point.

From the preceding description it is evident that the important requirements to obtain the useful products for the purposes of printing and graphic arts can be defined by their physical properties. Thus the polymer should have a heat distortion or softening temperature of 50 to 125°C. and should be in a dialkylamide to an extent of at least 10% and preferably 25% to form solutions having a viscosity sufficient for use in casting. Furthermore, a non-solvent such as water should be tolerated in small amounts when uniformly distributed in the solution but effect immediate precipitation of the polymer when its presence exceeds a certain point which is generally less than about 7.5% of the solution. The polymer solution should tolerate substantial amounts, e.g., 1–2%, of non-solvent before precipitation occurs. Preferred products are obtained when the polymer solution contains 3½ to 5½% water. Particularly desired are vinyl chloride copolymers in which the minor constituents contain some hydrophilic groups. Vinyl chloride homopolymer in dimethylformamide solution tolerates only about 2% of water before precipitation begins. The homopolymer is less preferred since solutions do not tolerate enough water to gve high quality opaque films. Particularly useful are vinyl chloride copolymers containing minor amounts of vinyl monomers which have present hydrophilic groups such as in methyl acrylate, ethyl acrylate, methyl methacrylate, vinyl acetate, etc. The specific composition in terms of copolymer content does not depend upon the exact monomers employed, but the resultant properties of the polymeric material for the purpose of the present invention. For example, copolymer solutions that tolerate large amounts of non-solvent, e.g., above 8% water, do not form highest quality films and take longer time than others to coalesce or coagulate when contacted with non-solvent in the washing operation.

The process of this invention provides products having opacity with an ease of clearing by the application of pressure along with high adhesion of the film to a dimensionally stable base. The adhesion should be sufficient to prevent pulling away of the film from the transparent substrate after application of pressure, friction, or heat. The opaque, clearable film obtained is resistant to degradation on storage and can be easily clarified by the application of pressure to selected portions of the film and the opacity can be further intensified by post treatments with dyes or opaque material within the open-cell pores upon which the initial opacity depends. These products are of particular utility in the printing art. Thus, when type face is pressed against the opaque film obtained as described above, an image-bearing transparency is obtained. A feature of the products of this invention is that, by virtue of the thinness and stability of the substrate and the opaque layer, the type face can be pressed against either the opaque film or the substrate with resultant selective clarification upon pressing of the opaque layer. Negatives obtained by such a process are useful to expose photopolymer printing plates as described in U.S. 2,760,863. Thin films as provided by the process of this invention that have the desired stability and ease of clarification provide a ready means of storing information and/or use as graphic arts materials. The selectively cleared films can be used in the preparation of printing plates directly therefrom. Still further advantages of the invention will be apparent from the foregoing description to those skilled in the art.

I claim:

1. A process for the formation of opaque, pressure-clearable vinyl polymer films having a thickness of 0.1 mil to 5.0 mils when dry which comprises:
  (a) coating a non-fibrous support with a solution of
    (1) 10% to 25% by weight of a water-insoluble vinyl addition polymer having a molecular weight of at least 10,000 and a softening point in the range 50° C.–100° C. in
    (2) a water-soluble dialkylamide wherein each alkyl group contains 1–2 carbon atoms;
  said solution containing a hydroxyl-containing non-solvent for said polymer selected from the group consisting of water, alkanols of 1–4 carbon atoms and mixtures of said non-solvents boiling at a temperature no higher than 100° C., in an amount of at least 45% but not more than 97% of that required to produce a hazy solution;
  (b) treating the resulting coating before there has been any significant evaporation of the water-soluble dialkylamide therefrom with a non-solvent selected from the group consisting of water and alkanols of 1 to 4 carbon atoms, to extract said dialkylamide, and
(c) removing said hydroxyl-containing non-solvent from the coating.

2. A process for the formation of opaque, pressure-clearable vinyl polymer film having a thickness of 0.1 mil to 5.0 mils when dry which comprises:
 (a) coating a non-fibrous support with a solution of
  (1) 10% to 25% by weight of a water-insoluble vinyl addition polymer having a molecular weight of at least 10,000 and a softening point in the range 50° C.–100° C. in
  (2) a water-soluble dialkylamide wherein each alkyl group contains 1–2 carbon atoms;
 said solution containing a hydroxyl-containing non-solvent for said polymer selected from the group consisting of water, alkanols of 1–4 carbon atoms and mixtures of said non-solvents boiling at a temperature no higher than 100° C., in an amount of at least 45% but not more than 97% of that required to produce a hazy solution;
 (b) treating the resulting coating at a temperature above the dewpoint of the surrounding atmosphere while it contains 45%–97% of non-solvent and before there has been any significant evaporation of the water-soluble dialkylamide therefrom with a non-solvent for the polymer selected from the group consisting of water and alcohols of 1–4 carbon atoms to extract said alkylamide from the coating; and
 (c) removing said hydroxyl-containing non-solvent from the coating.

3. A process as defined in claim 2 wherein the non-solvent is removed in accordance with step (c) by drying.

4. A process according to claim 2 wherein said support is a thin, transparent, hydrophobic film base.

5. A process according to claim 2 wherein said support is a thin, transparent, biaxially oriented polyethylene terephthaalte film base.

6. A process according to claim 2 wherein said polymer is a vinyl chloride copolymer in which vinyl chloride is the major constitutent.

7. A process according to claim 2 wherein said hydroxyl-containing non-solvent is an alkanol of 1–4 carbon atoms.

8. A process according to claim 2 wherein said non-solvent used in step (b) is water.

9. A process according to claim 2 wherein the dialkylamide contains alkyl groups of 1–4 carbon atoms.

10. A process according to claim 2 wherein said polymer is a vinyl chloride copolymer in which vinyl chloride is the major constituent and said dialkylamine is dimethylformamide.

11. A process according to claim 2 wherein said polymer is a vinyl chloride-methyl acrylate copolymer in which vinyl chloride is the rajor constituent and said dialkylamide is dimethylformamide.

References Cited
UNITED STATES PATENTS

| | | | |
|---|---|---|---|
| 2,783,894 | 3/1957 | Lovell et al. | 210—500 |
| 2,848,752 | 8/1958 | Bechtold | 117—36.7 |
| 2,939,802 | 6/1960 | Werle et al. | 117—36.7 |
| 2,957,791 | 10/1960 | Bechtold et al. | 117—36.7 |
| 3,000,757 | 9/1961 | Johnston et al. | 117—63 |
| 3,014,301 | 12/1961 | Grupe | 117—36.7 |

MURRAY KATZ, *Primary Examiner.*